United States Patent [19]
Matsumura et al.

[11] 3,846,392
[45] Nov. 5, 1974

[54] METHOD OF MANUFACTURING CYCLOOLEFINES

[75] Inventors: Shoichi Matsumura, Akashi; Itaru Hatano, Kobe, both of Japan

[73] Assignee: Kanegafuchi Kagaku Kogyo Kabushiki Kaisha, Osaka, Japan

[22] Filed: Sept. 11, 1972

[21] Appl. No.: 287,618

[30] Foreign Application Priority Data
Sept. 20, 1971 Japan.............................. 46-73628

[52] U.S. Cl. ... 260/93.1, 260/33.6 UA, 260/88.2 B, 260/88.2 F
[51] Int. Cl........... C08f 1/34, C08f 1/38, C08f 1/42
[58] Field of Search........... 260/93.1, 88.2 B, 88.2 F

[56] References Cited
UNITED STATES PATENTS
3,074,918   1/1963   Eleuterio .......................... 260/93.1

*Primary Examiner*—Stanford M. Levin
*Attorney, Agent, or Firm*—Moonray Kojima

[57] ABSTRACT

Method of polymerizing cycloolefines by solution polymerization using a cataylst obtained by reacting an oxide of a transition metal of group VI and a Lewis acid, adding an inert solvent thereto and using the supernatant liquid or filtrate as the catalyst. An organometallic compound of a metal of group I through IV may be added to the reaction product. A halogenated hydrocarbon may also be added thereto.

11 Claims, No Drawings

METHOD OF MANUFACTURING CYCLOOLEFINES

BACKGROUND OF THE INVENTION

The present invention relates to a method of polymerizing cycloolefines, and more particularly to such a method which may be used advantageously on an industrial scale.

Natta, et al. reported that cycloolefines can be polymerized using a catalyst containing a salt of a transition metal of group IV or group VI, such as tungsten hexachloride, and an organoaluminum compound (Angew. Chem., 76 765 (1964)). However, since this prior method requires a considerably large amount of catalyst as compared with the monomer and the catalytic activity of the catalyst is low, industrial use is limited because the cost of the catalsyt is high.

This prior method involves block polymerization and the product thereof is in a low yield of about 20–50 percent. If higher yield is desired, gelation results. Hence this prior method is unsuitable for production on a commercial or industrial scale. If this prior method is carried out by solution polymerization conversion or yield is less than 20 percent.

The foregoing problems seen to arise because the salts of group VI metals, such as tungsten hexachloride, are synthesized at high temperature under high pressure and are purified by laborious procedures thereby resulting in extremely expensive catalysts. An important industrial problem which exists today is to reduce the cost of the catalyst used to manufacture cycloolefine polymers. These polymers have useful and extremely interesting properties. Thus, any improvement in the catalyst would have extensive effects.

DETAILED DESCRIPTION OF INVENTION

Extensive studies by the present inventors resulted in the present invention, in which polymers are obtained in high yield with extremely small amount of catalyst of high activity. The polymer yield did not exceed 20 percent by use of catalytic system described by Natta, et al. On the other hand, the polymer yield exceeds 20 percent by use of the catalyst system of the present invention. Another important advantage of the present invention is that the catalyst is easily prepared and at low cost. The present catalytic system was proven to be entirely new as will be described hereinafter in greater detail.

The present invention encompasses a method of manufacturing polymers wherein a cycloolefine of 4–5 carbon atoms or 7 or more carbon atoms and having at least one double bond in a ring is polymerized using an inert solvent soluble catalyst which is the reaction product of an oxide of a transition metal of group VI and a Lewis acid. In another embodiment of the invention the oxide of the transition metal of group VI and the Lewis acid may be combined with anorganometallic compound of a metal of groups I through IV. In the polymerization of cyclopentene or cyclopentene and another cycloolefine, a halogenated hydrocarbon may be added.

Advantageously, the inventive catalyst is highly active, and only a small amount is required in the polymerization of cycloolefines. Also, the cost is dramatically reduced to a a point where commercial production of polymers of cycloolefines is feasible.

The catalyst of the present invention involves a reaction produce of an oxide of a transition metal of group VI-B, such as tungsten oxides or molybdenum oxides, which is commerically available at a reasonable price as a raw material, and a Lewis acid, such as aluminum chloride. The catalyst may be obtained as follows: Both of the foregoing components are blended and reacted together. An inert solvent is added thereto. The resulting supernatant liquid or filtrate is used as the catalyst. Alternatively, the reaction mixture may be heated in an inert solvent, excess solid removed by filtration, and the filtrate used as the catalyst, or its supernatant liquid used as the catalyst.

Advantageously, the inventive catalyst thus obtained is in the form of a homogeneous solution in the solvent. Hence, the polymer produced using such catalyst does not contain solid catalyst or residual catalyst which results in reducing the quality thereof.

Also, advantageously, only a small amount of catalyst is needed. Thus polymerization in the presence of such a small amount of catalyst eliminates the necessity of another process step for removing the catalyst.

The inert solvents which may be for the catalytic reaction are aliphatic hydrocarbons, aromatic hydrocarbons, halogenated hydrocarbons, etc. such as n-hexane, cyclopentane, cyclohexane, benzene, toluene, xylene, chlorobenzene, methylene chloride, chloroform and mixtures thereof. Of course, the solvent may be either the same or different from polymerization solvent. In the polymerization of cycloolefines, aliphatic hydrocarbons, aromatic hydrocarbons or halogenated hydrocarbons may be used as polymerization solvents. Solution polymerization may be employed to advantage.

If a higher activity is desired in the copolymerization of cyclopentene or a cyclopentene and another cycloolefine, it is particularly effective to use as activating agent one or more of the following halogenated aliphatic hydrocarbon or halogenated aromatic hydrocarbon. This fact has been proven by experiments. This is also an advantageous feature of the present invention as compared with conventional processes.

These compounds may be used in the form of a mixture with another aliphatic hydrocarbon such as pentane, hexane, cyclopentane or cyclohexane.

As particularly effective halogenated aliphatic compounds, or halogenated aromatic compounds there may be mentioned, for example, methyl chloride, dichloromethane, chloroform, carbon tetrachloride, ethyl chloride, 1,1-dichloroethane, 1,2-dichloroethane, 1,1,2,2-tetrachloroethane, pentachloroethane, tetrachloroethylene, 1,2-dichloroethylene, trichloroethylene, 1-chloropropane, 2-chloropropane, 3-chloropropane, 1-chlorobutane, 2-chloropentane, chlorobenzene, brombenzene, 0-dichlorobenzene, m-dichlorobenzene and p-dichlorobenzene.

The foregoing activators include compounds which may be used as a solvent and their molar ratio to the group VI metal, such as tungsten or molybdenum, has no limitation, but is enough to be effective if the ratio is below 10 : 1.

The polymerization temperature may be selected within the temprature range between −50°C and 80°C, but it is desirable from a commercial viewpoint to carry out the polymerization at a temperature between about −20°C and 30°C.

The amount of the group VI metal; such as tungsten or molybdenum, is determined to be 100–5,000 ppm by fluorescent X ray analysis. It is desirable to use nearly saturated solution of the group VI metal, such as tungsten or molybdenum.

A Lewis acid, such as aluminum chloride, reacts with the group VI metal, such as tungsten or molybdenum, to form a soluble complex compound in a solvent. In these sense, the catalytic system of the present invention is entirely different from conventional catalytic systems. The inventive catalyst system comprising a complex compound has far higher activity than the conventional catalysts.

As aforementioned, the components used for preparing the inventive catalyst are oxides of transition metals of group VI -B and Lewis acids. The best results are obtained when the maximum amount of each component reacts and dissolves in a hydrocarbon solvent to form a catalyst solution. The amount of active catalyst in an inert solvent depends upon properties of the respective components used, type of solvent and aging conditions such as aging temperature and time. The residue remaining after removal of the soluble catalyst can be used repeatedly for the preparation of the catalyst.

Temperature and time required for aging depend upon type of solvent used. The aging may be carried out by heating the system to a suitable convenient temperature between room temperature and 250°C and for several hours. The catalyst may also be aged at a higher temperature and for a longer period of time.

The cyloolefines used in the present invention may be cyclic hydrocarbon compounds of 4–5 carbon atoms or more than 7 carbon atoms inclusive having at least one double bond in a ring. Such compounds are, for example, cyclobutene, cyclopentene, cyclooctene, cyclodecene, 1,5-cyclooctadiene, 1,5,9-cyclododecatriene, norbornene, norbonadiene, diclopentadiene, etc. Cyclopentene is barely polymerized in the presence of a prior catalytic system prepared from tungsten hexachloride and aluminum chloride at a low temperature ($-10°C$ to $0°C$). However, surprisingly, the cyclopentene can be solution-polymerized very rapidly in the presence of the present inventive catalytic system discovered by the inventors, and even at a low temperature. This illustrates another advantageous feature of the catalytic system of the present invention. Aluminum chloride when used for form the inventive catalyst system forms a particular complex compound with the metal of group VI; Thus, the inventive catalyst is entirely different from conventional catalysts.

The color of the active catalyst of the present invention may be dark brown or dark red with the highest activity. Color of the catalytic system changes from yellow through dark brown to red as the reaction with the Lewis acid, such as aluminum chloride, proceeds. Low polymerization yield is obtained with the catalyst of yellowish brown. When one mole of tungsten catalyst solution is added to 5,000–10,000 moles of cyclopentene, the reaction solution is red or dark red in color and its activity is sufficiently high.

Although cycloolefines can be polymerized easily by using the inventive soluble catalyst, an organometallic compound may be further added to the reaction product of oxide of group VI metal and Lewis acid in view of the problems of stereospecificity, polymerization yield, polymerization velocity and gel formation. Thus, using the organometallic compound, the stereospecificy was kept high (at an industrially useful value), yield was increased, polymerication reaction velocity was elevated and gel formation suppressed.

As the organometallic compound, an organometallic compound of a metal of groups I through IV may be selected for best results. Among them, an organoaluminum compound is the most favorable from the commercial viewpoint. They are, for example, $(C_2H_5)_2AlBr$, $(C_2H_5)_3Al$, $(C_4H_9)_3Al$ and $(i-C_4H_9)_3Al$, $C_2H_5AlCl_2$, $(C_2H_5)_2AlCl$, $(C_2H_5)_3Al_2Cl_3$, $C_2H_5AlBr_2$. Excellent results may be obtained also if a mixture of these compounds is used.

The Lewis acids used in the present invention are aluminum chloride, aluminum bromide, aluminum iodide, boron trichloride, titanium tetrachloride, stannic chloride, vanadyl trichloride and mixtures thereof. Among them, aluminum chloride is the most favorable from handling or commercial viewpoints.

The molar ratio of the oxide of group VI metal, such as tungsten or molybdenum, to the Lewis acid, such as aluminum chloride, may be chosen optionally and no limitation is provided with respect to this ratio. However, the molar ratio of said mixture to an organoaluminum compound is an important factor for stereospecificity of the resulting polymer. A sufficient amount of organo metal compound is 0.1–50 moles, preferably 0.1–10 moles, per mole of group VI metal, such as tungsten or molybdenum.

Thus, a sufficiently high activity can be obtained by using, per mole of monomer, catalyst solution containing 0.1–1 millimole of tungsten or molybdenum and 0.01–50 millimoles of an organo metal, such as an organoaluminum, compound.

According to the present invention, polymerization may be carried out by first dissolving a cycloolefine in an inert solvent and then adding to the solution, a soluble catalyst composed of an oxide of transition metal of group VI and a Lewis acid and for some cases where desired an organoaluminum compound. The inert solvent used herein to place the cycloolefine in solution may be either the same as or different from that used for the preparation of the inventive catalyst.

The catalytic system of the present invention is advantageously characterized by high activity. It facilitates formation of a soluble polymer with negligible amount of gel formation. In addition, it has commercially very important features; namely, low cost and ease of handling.

The process of the present invention can be carried out on a commercial scale by, for example, charging a solvent, a monomer and inventive catalyst solution successively into a polymerization reaction vessel, cooling the vessel to a predetermined temperature and then adding an organoaluminum compound thereto.

As for after-treatment of the reaction, the same procedures as in the preparation of polybutadiene according to solution-polymerization may be employed.

The resulting cyclopentene homopolymer or copolymer thereof with a small amount of another component is rubbery elastomer having physical properties similar to natural rubber of a high aging resistance. Therefore, as aforementioned, the product has large commercial applications, such as use as a raw material of tires or other industrial products. Other cycloolefine polymers thus produced are also useful and valuable owing to their specific structures.

The oxides of group VI metals include all oxides thereof, such as $WO_2$, $WO_3$, $MoO_2$, $MoO_3$, etc.

The present invention will now be illustrated by way of actual Examples.

EXAMPLE 1 a. Preparation of Catalyst:

Under nitrogen atmosphere free from humidity, 10.0gm (43.1 millimoles) of anhydrous tungsten oxide ($WO_2$ or $WO_3$) were mixed and thereby ground together with 17.3 gm (129.3 millimoles) of aluminum chloride. Added to the mixture was 100 ml of chlorobenzene and the resulting mixture was refluxed in a vessel provided with a condenser at 180°C for 7 hours. After elevating the temperature of the reaction system to about room temperature, 76 ml of the supernatant liquid were transferred with a syringe to another flask under nitrogen atmosphere. The thus obtained catalyst solution (122 ml) was subjected to gravimetric analysis to reveal that tungsten and aluminum concentrations were 0.15 millimole/ml and 0.41 millimole/ml. respectively.

b. Polymerization of Cyclopentene:

In a flask provided with a stirrer and a nitrogen-introduction pipe and into which a sample can be introduced, 100 ml (77.8 gm) of cyclopentene, 300 ml of chlorobenzene and 4.8 ml of the catalyst solution prepared in Example 1-(a) (corresponding to 0.72 millimole of tungsten) were charged under nitrogen atmosphere. The solution was dark red in color. The polymerization vessel was cooled to −5°C and then 1.9 millimoles of diethyl aluminum chloride (solution in 1.0 ml toluene) were added dropwise thereto, while polymerization temperature was kept at a temperature in the range of −5°C to 0°C. After 3 hours, the polymerization reaction was terminated by addition of a solution 100 milligrams of phenyl-B-naphthylamine in 30 ml of mixture of benzene and methanol (in the ratio 9 : 1). The product was reprecipitated with methanol and purified. The rubbery elastomer thus obtained was dried at about room temperature under vacuum until the solvent had been removed completely. The weight of the product was 55.3 gm (yield of 71 percent). It was revealed by infrared absorption spectrum that the polymer comprised 92 percent of trans-double bond and 8% of cis-double bond.

The presence of trans-double bond was shown characteristically by an absorption band at 10.35μ and the presence of cis-double bond was shown characteristically by a wide absorption band at 7.1μ. The proportion of cis-double bond to trans-double bond to trans-double bond was calculated from the absorption bands. The intrinsic viscosity ($\eta$) of the product, measured in toluene at 25°C, was 1.8.

EXAMPLES 2–5

In these Examples, the polymerization of cyclopentene was carried out in the presence of the catalyst solution prepared in Example 1 (a) and in the same manner as in Example 1 (b). The results are summarized in Table I.

Table I

| Example | Tungsten concentration (millimole) | Alkyl aluminum (millimole) | | Organo Al/tungsten (molar ratio) | Yield (%) | $\eta$ |
|---|---|---|---|---|---|---|
| 2 | 0.84 | $Et_3Al$ | 2.4 | 4.2 | 75 | 6.6 |
|   |      | $EtAlCl_2$ | 1.0 |   |   |   |
| 3 | 0.81 | $Et_3Al$ | 2.4 | 2.9 | 67 | 2.5 |
| 4 | 0.72 | $Et_3Al$ | 1.4 | 1.9 | 65 | 1.9 |
| 5 | 0.69 | $Et_3Al_2Cl_3$ | 1.8 | 2.6 | 56 | 3.8 |

EXAMPLE 6

Polymerization was carried out in the same manner as in Exammple 1 but the scale of experiment was reduced to 1/10.

In a reactor, 10 ml (7.7 gm) of a suitable monomer, such as cyclopentene, 30 ml of benzene chloride and 0.54 ml (corresponding to 0.08 millimole of tungsten) of the catalyst solution prepared in Example 1 (a) were charged. The reaction system was cooled to −0.5°C and added dropwise thereto was 0.19 millimole of diethl aluminum chloride (solution in 0.1 ml cyclohexane). The polymerization temperature was kept at −5°C to −0°C. After 4 hours, the reaction was terminated in the same manner as in Example 1(b) and the polymer was dried under vacuum to obtain 5.1 gm (yield of 66 percent of the product. Infrared absorption spectrum of the polymer revealed 91 percent trans-double bond. Intrinsic viscosity was 1.98 (determined in toluene at 25°C).

EXAMPLES 7–12

The polymerization was carried out in the same manner as in Example 6. The results are summarized in Table II.

Table II

| Example | Tungsten conc. (millimole) | Molar ratio of cyclopentene to tungsten | Alkyl aluminum (millimole) | | Molar ratio of organo-aluminum to tungsten | Yield (%) |
|---|---|---|---|---|---|---|
| 7 | 0.027 | 4250 | $Et_3Al$ | 0.24 | 12.5 | 66 |
|   |       |      | $EtAlCl_2$ | 0.10 |   |   |
| 8 | 0.025 | 4590 | $Et_3AlCl_2$ | 0.10 | 13.6 | 79 |
|   |       |      | $EtAlCl_2$ | 0.10 |   |   |
| 9 | 0.023 | 5000 | $(i-C_4H_9)_3Al$ | 0.10 | 4.3 | 71 |
| 10 | 0.022 | 5210 | $Et_3Al$ | 0.048 | 2.1 | 79 |
| 11 | 0.019 | 6040 | $Et_3Al$ | 0.048 | 2.5 | 60 |
| 12 | 0.012 | 9560 | $Et_3Al$ | 0.24 | 28.3 | 21 |
|    |       |      | $EtAlCl_2$ | 0.10 |   |   |

COMPARATIVE EXAMPLE 1

The comparative experiment was effected in the same manner as in Example 6. 10 milligram (0.0 5 millimole) of tungsten hexachloride were dissolved in 40 ml of chlorobenzene. The solution was red in color. 0.2 ml (corresponding to 0.14 millimole) of a solution of triisobutyl aluminum in n-hexane was added dropwise to the mixture to carry out the polymerization. Yield of the polymer thus obtained was only 0.21 gm (yield of 2.7 percent).

COMPARATIVE EXAMPLE 2

The procedures of Comparative Example 1 were repeated except that aluminum chloride was added as catalyst. Namely, 40 milligram (about 0.10 millimole) of tungsten chloride, 40 ml of chlorobenzene and 10 ml of cyclopentene were charged into a reactor. The mixture was cooled to about $-5°C$ and added thereto was 0.14 millimole of triisobutyl aluminum. After-treatment was effected in the same manner as in Example 6 to obtain 4.4 gm (yield of 57 percent) of the polymer. The polymer was gelated and it was unsuitable for use as synthetic rubber.

EXAMPLES 13–20

In these Examples, the polymerization was carried out in the same manner as in Example 6 except that the various inert solvents were used in place of benzene chloride. The results were as shown in Table III.

aluminum (solution in 0.02 ml cyclohexane). Immediately, the polymerization was started. After 6 hours, the same after-treatment as in Example 6 was effected to obtain 5.6 gm of the polymer (76 percent conversion). Intrinsic viscosity was 2.5 (measured in toluene at 25°C).

EXAMPLE 22

A copolymer of cyclopentene was prepared in the same manner as in Example 21 except that 0.1 ml (0.088 gm) of 1, 5-cyclooctadiene was used in place of cyclooctene to obtain 6.0 gm (79 percent) of the copolymer. Intrinsic viscosity was 2.2 (measured in toluene at 25°C).

EXAMPLE 23

Polymerization of cyclooctene in place of cyclopentene as shown in Example 6:

The polymerization was carried out in the absence of oxygen or humidity. 10 ml (8.4 gm) of cyclooctene, 20 ml of toluene and 0.3 ml (corresponding to 0.045 millimole of tungsten) of the catalyst solution prepared in Example 1 (a) were charged into a flask. 0.5 millimole of ethyl aluminum dichloride was added to the solution at ambient temperature (without cooling) whereby the polymerization reaction proceeded rapidly. The reaction mixture was subjected to after-treatment in the same manner as in Example 6. Polymerization yield after 3 hours was 42 percent (3.5 gm). Intrinsic viscosity, measured in toluene at 25°C, was 1.5.

Table III

| Example | Tungsten conc. (m mole) | Alkyl aluminum | (m mole) | Solvent | Amount of solvent | Yield (%) |
| --- | --- | --- | --- | --- | --- | --- |
| 13 | 0.08 | Et$_2$AlCl | 0.19 | Chlorobenzene/cyclohexane 1:1 | 40 | 63 |
| 14 | 0.08 | Et$_2$AlCl | 0.19 | Cyclopentane | 30 | 0 |
| 15 | 0.045 | Et$_3$Al | 0.072 | Chlorobenzene/dichloromethane 1:1 | 30 | 66 |
| 16 | 0.045 | Et$_3$Al | 0.072 | Dichloromethane | 10 | 86 |
| 17 | 0.03 | Et$_3$Al | 0.048 | Bromobenzene | 10 | 12 |
| 18 | 0.027 | Et$_3$Al | 0.24 | Chlorobenzene/cyclohexane 1:1 | 40 | 33 |
| 19 | 0.027 | Et$_3$Al | 0.24 | Cyclohexane | 40 | Very small amount |
| 20 | 0.027 | Et$_3$Al | 0.24 | Cyclohexane | 30 | 3 |
| Comparative example | 0.027 | Et$_3$Al EtAlCl$_2$ | 0.24 0.10 | Chlorobenzene | 30 | 66 |

EXAMPLE 21

Preparation of a copolymer of cyclopentene and cyclooctene:

The polymerization was carried out under nitrogen atmosphere free from humidity and oxygen in the same manner as in Example 6. In a flask, 10 ml (7.7 gm) of cyclopentene, 0.1 ml (0.084 gm) of cyclooctene and 15 ml of chlorobenzene were charged and then, 0.2 ml (corresponding to 0.030 millimole of tungsten) of the catalyst solution prepared in Example 1 (a) was added thereto. The solution was cooled to about −10°C and added thereto dropwise was 0.048 millimole of triethyl

EXAMPLE 24

Polymerization of 1, 5-cyclooctadiene:

The polymerization was carried out in the absence of oxygen or humidity. 10 ml (8.77 gm) of 1,5-cyclooctadiene, 40 ml of toluene and 0.5 ml (0.075 millimole of tungsten) of the catalyst solution prepared in Example 1 (a) were charged into a flask. 0.2 millimole of ethyl aluminum dichloride was added to the solution at ambient temperature (without cooling), whereby the polymerization reaction proceeded rapidly. After 10 minutes, the reaction system was treated in a usual manner to obtain 6.2 gm of the rubbery product (71 percent conversion). Intrinsic viscosity, measured in toluene at 25°C, was 2.6.

EXAMPLE 25

20 ml of benzene, 0.432 gm (3.0 millimoles) of molybdenum oxide and 0.80 gm (0.6 millimole) of aluminum chloride were stirred together under heating to 80°C for 5 hours, and then the mixture was cooled back to room temperature.

From the resulting mixture, 18 ml of supernatant liquor (color: red brown) were used as catalytic solution. Upon addition of 3 ml of 1,5-cyclopentadiene to the solution, polymerization reaction was started immediately. After reacting for 2 hours, the reaction product was treated in the usual manner to obtain 0.40 gm (17 percent) of the polymer. Infrared absorption spectrum indicated that this polymer was similar to 1,4-polybutadiene and it had 20 percent of trans-double bond and 80 percent of cis-double bond.

Intrinsic viscosity, measured in benzene at 30°C, was 0.06.

The foregoing description is illustrated of the principles of the invention. Numerous modifications and variations thereof would be apparent to the worker skilled in the art. All such modifications and variations are to be considered to be within the spirit and scope of the invention.

What is claimed is:

1. A method of manufacturing polymer wherein a cycloolefine of 4–5 carbon atoms or more than 7 carbon atoms having at least one double bond in a ring is polymerized in an inert solvent at a temperature of from −50°C to 80°C using an inert solvent soluble homogeneous catalyst component (A) produced by reacting oxide of tungsten or molybdenum and Lewis acid in a halogenated hydrocarbon at a temperature of 80°C or more or using a catalytic system wherein said catalyst component (A) is combined with an organometallic compound (B) including a metal of group I through group IV, wherein a molar ratio of tungsten or molybdenum in the component (A) to said organometallic compound (B) is 1: (0.1 to 50), and wherein a mole ratio of tungsten or molybdenum in the component (A) to cyclopentene is 1: (5,000 to 10,000).

2. Method of claim 1, wherein said halogenated hydrocarbon is one or more selected from the group consisting of chlorobenzene, O-dichlorobenzene, m-dichlorobenzene, p-dichlorobenzene, bromobenzene, tetrachloroethylene, and trichloroethylene or mixture of said halogenated hydrocarbon and inert hydrocarbon.

3. Method of claim 1, wherein said inert solvent is selected from the group consisting of n-hexane, cyclopentane, cyclohexane, benzene, toluene, xylene, chlorobenzene, methylene chloride, chloroform and mixtures thereof.

4. Method of claim 1, wherein said halogenated hydrocarbon is mixed with an aliphatic hydrocarbon selected from the group consisting of pentane, hexane, cyclopentane, cyclohexane and mixtures thereof.

5. Method of claim 1, wherein halogenated hydrocarbon is in an amount of below 10:1 mole ratio to said metal of tungsten or molybdenum.

6. Method of claim 1, wherein said polymerization temperature is between about −20°C and about 30°C.

7. Method of claim 1, wherein said inert solvent and product are aged at a temperature of from room temperature to about 250°C.

8. Method of claim 1 wherein said organometallic compound is selected from the group consisting of $C_2H_5AlCl_2$, $(C_2H_5)_2 AlCl$, $(C_2H_5)_3 Al_2Cl_3$, $C_2H_5Al Br_2$,/$(C_4H_9)_3 Al$, $(i-C_4H_9)_3 Al$, and mixtures thereof.

9. Method of claim 1, wherein said Lewis acid is selected from the group consisting of aluminum chloride, aluminum bromide, aluminum iodide, boron trichloride, titanium tetrachloride, stannic chloride, vanadyl trichloride and mixtures thereof.

10. Method of polymerizing a cycloolefine of 4–5 carbon atoms or 7 or more carbon atoms having at least one double bond in a ring according to claim 1, comprising using a solution catalyst comprising an inert solvent and dissolved therein a product resulting from reaction of oxides of titanium or molybdenum and a Lewis acid, said solution catalyst being the resulting supernatant liquor or filtrate.

11. Method of claim 10 wherein said product is heated in said inert solvent and excess solids are removed by filtration.

* * * * *